April 18, 1933.    A. W. KEUFFEL    1,904,474
SLIDE RULE
Filed Oct. 29, 1930    2 Sheets-Sheet 1
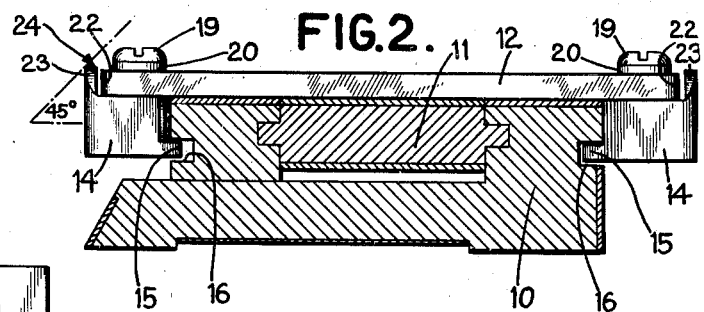
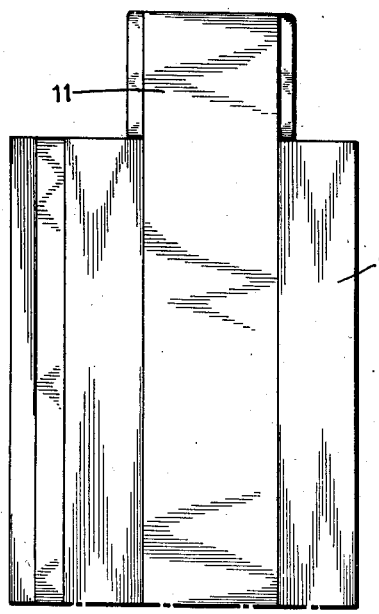
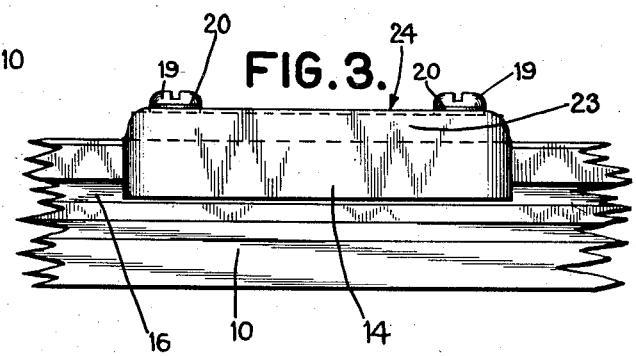
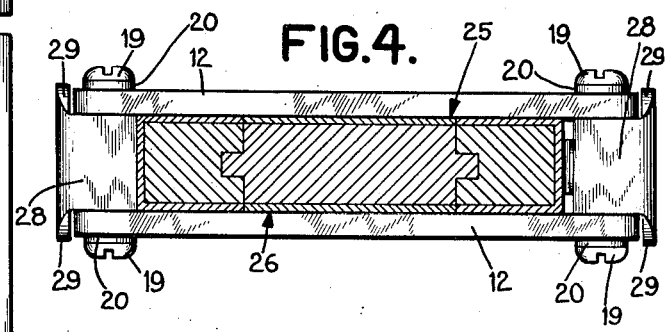
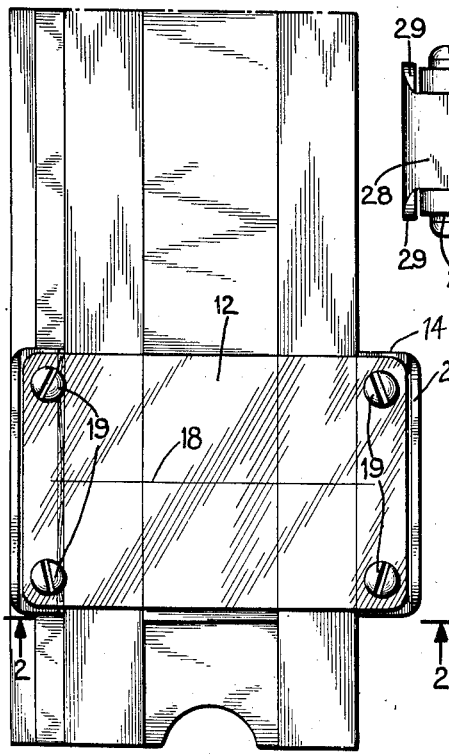
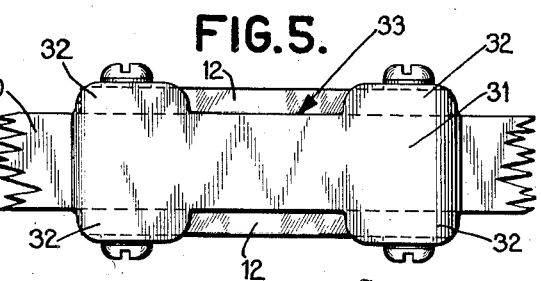
Inventor
ADOLF W. KEUFFEL
By his Attorneys
Bohleber & Ledbetter

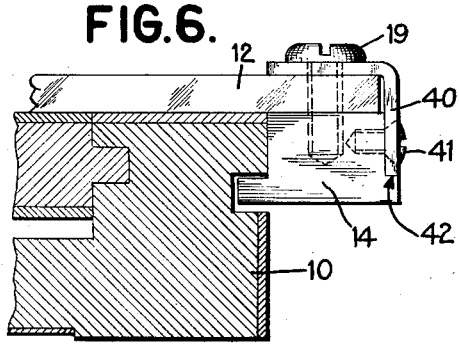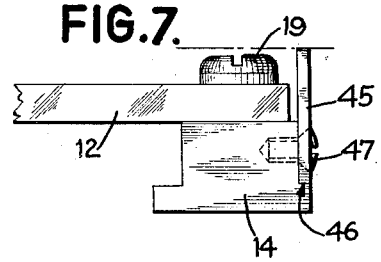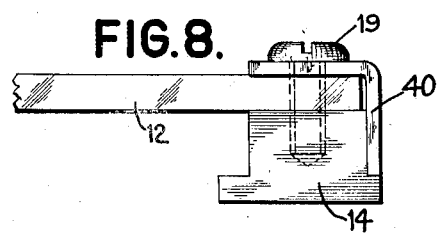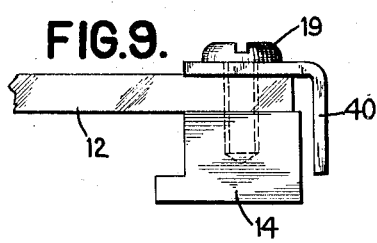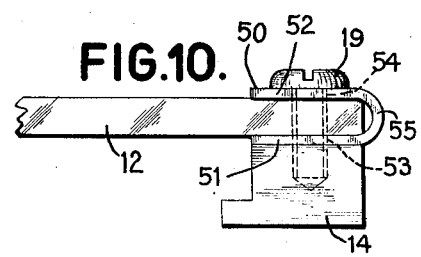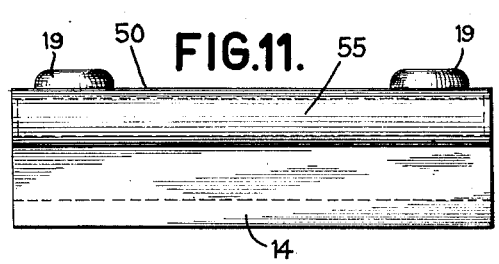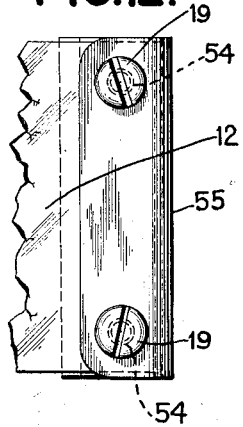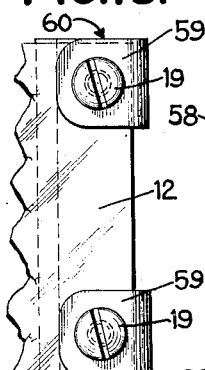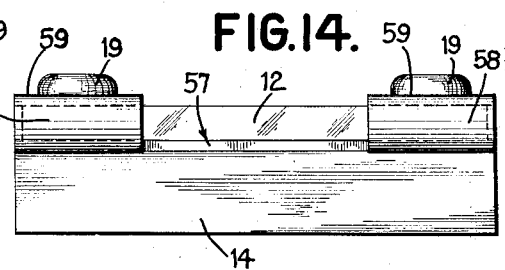

Patented Apr. 18, 1933

1,904,474

UNITED STATES PATENT OFFICE

ADOLF W. KEUFFEL, OF MONTCLAIR, NEW JERSEY, ASSIGNOR TO KEUFFEL & ESSER CO., OF HOBOKEN, NEW JERSEY, A CORPORATION OF NEW JERSEY

SLIDE RULE

Application filed October 29, 1930. Serial No. 491,855.

This invention relates to slide rules and more particularly to runners therefor. The primary object of the invention is the protection of the glass, or other transparent medium bearing the hair-line against damage should the slide rule be dropped.

Slide-rule runners have, heretofore, comprised a frame in which was set the glass or other transparent sheet inscribed with the hair-line. Such frame has been disadvantageous, however, in that it obstructed the view of divisions of the scales often necessary to the reading.

In accordance with the invention, the plate of glass or other transparent material upon which the hair-line is scribed is carried with guides or side bars traveling in grooves in the sides of the slide rule, means being provided to shield the transparent material. In one aspect, the shielding means is formed of material having an inherent resiliency whereby shock imparted thereto will be absorbed and dissipated and not transmitted to the transparent plate. In another aspect of the invention, the shielding means is spaced from the ends or edges of the transparent plate and, where carried with the guides, transmits the shock of impact directly through the guide to the body of the rule. The guides are conveniently formed of pyroxylin or any other material which may be molded or machined. Protective elements such as flanges or fins may be formed directly with the guides, or as separable elements, being preferably positioned in spaced relation to those ends or edges of the transparent plate which extend in the longitudinal direction of the slide rule and the elements extend upwardly preferably above the surface of the plate so as to protect the plate and shield it from contact as when the slide rule falls or is struck.

The invention also has to do with a runner construction which is practical from the standpoint of ease and cheapness of manufacture and convenience in assembly and use.

These and other objects of the invention and the means for their attainment will be more apparent from the following detailed description, taken in connection with the accompanying drawings illustrating various embodiments by which the invention may be realized, and in which:—

Figure 1 is a plan view of a slide rule to which the runner according to the present invention is applied, the intermediate portion of the rule being broken away and a representation of scales being omitted.

Figure 2 is a transverse sectional view taken on the line 2—2 of Figure 1, looking in the direction of the arrows, and showing the runner, in end elevation, as applied to what is known as a Mannheim type slide rule.

Figure 3 is a view showing, in side elevation, a fragmentary portion of the slide rule and runner illustrated in Figures 1 and 2.

Figure 4 is a transverse sectional view similar to Figure 2 but showing the invention applied to a slide rule of the kind having scales upon both faces.

Figure 5 is a view showing, in side elevation, a runner for a slide rule of the type shown in Figure 4, but illustrating a modification of the shielding means for the transparent plate.

Figure 6 is a fragmentary transverse sectional view showing a modification in which the shielding means is secured to the side of the runner and above the transparent plate.

Figure 7 is a fragmentary view, in end elevation, showing a construction similar to that shown in Figure 2, but wherein the protective element is separable from the runner.

Figure 8 is a view similar to Figure 6 but showing the protective element secured as by an adhesive.

Figure 9 is a view similar to Figure 8, but showing the protective element secured only beneath the screw holding the transparent plate to the runner.

Figure 10 shows a protective element bowed outwardly around the end of the transparent plate, being held in position by the plate holding screw.

Figure 11 is a view looking from the left in Figure 10.

Figure 12 is a plan view, looking from above in Figure 10.

Figure 13 is a plan view showing a construction similar to that of Figures 10, 11 and 12 but wherein the protective elements are spaced and substantially similar in effect to that construction shown in Figure 5.

Figure 14 is a view in side elevation of the modification shown in Figure 13.

Referring first to Figures 1, 2 and 3, the rule 10 and slide 11 are shown without scales as these form no part of the present invention. The runner is illustrated as having the transparent plate 12 affixed thereto so as to afford unobstructed vision of the scales and comprises guides 14, 14 having the usual tongues 15 sliding in the grooves 16, as will be understood. Secured to the guides 14, 14 is the sheet or plate of transparent material 12, such as glass, preferably generally rectangular, on which is inscribed the hair-line 18 by which the scale is read. The transparent plate 12 will hereafter be referred to as the glass 12. In the illustrated embodiment, it is secured to the guides 14 by screws 19 passing through oversize holes in the glass and threaded into the runners, the heads of the screws 19 being spaced from the plate 12, say, by washers 20 which are preferably of pyroxylin or other non-metallic material. In accordance with the present invention, the guides 14, 14 are increased in width, that is, in a direction transversely of the slide rule, and the side margin surfaces thereof, that is, the surfaces lying parallel to the longer sides of the rule are extended upwardly beyond the marginal edges or ends 22 of the glass 12. A flange, ridge or fin 23 is shown in Figures 1, 2 and 3 as carried with the guide, preferably at right angles to the plane of the surface of the rule, the top surface 24 of the flange 23 being above the top surface of the glass 12. This flange 23 is shown as spaced from the edge of the glass plate 12 so that, if the slide rule is dropped, any blow or shock is received by the flange 23. Since the flange 23 is carried by the guide 14, the blow or shock is transmitted through the guide to the body of the rule and the glass is thus protected. The rib is formed of material which has an inherent degree of resiliency thereby enabling it to yield and absorb shock and prevent its transmission in whole or in part. For convenience and cheapness, the flange 23 is formed integral with the guide 14, which may be made of pyroxylin or other material which, in the flange, will have the desired degree of resiliency.

It is within the purview of the invention that the flange 23 may have any desirable height, but preferably the top surface 24 thereof is at such an elevation above the guide 14 that even though the rule is dropped, say, with the edge 24 downward, the plate 12 will be shielded by the edge 24 and the glass will not be damaged. This will be apparent from an inspection of Figure 2 where a line is shown at a 45° angle to the plane of the face of the rule to just touch the corner of the rib 23. If this line represents the position of a surface struck by the rule in falling, it will be seen that the head of the screw 19 does not strike the surface and thus the glass and its fastening is protected by the guide. Obviously, the rib 23 may extend from the guide 14 to or above the plane of the top surface of the glass plate 12 and may even extend above the plane including the tops of the heads of the screws 19 so that even though the rule is dropped face downward, the blow is received by the ribs 23 and not by the screws 19 or plate 12.

Figure 4 illustrates the invention applied to a runner for a slide rule having scales upon both faces 25 and 26. Here, the runner is provided with glass plates 12 upon opposite sides of the guides 28. In this modification, flanges 29 are shown as carried with both outside faces or sides of the guides 28. These may extend the length of the guides and function as hereinbefore described.

A further modification of the invention is illustrated in Figure 5. It is also shown as applied to a runner for a slide rule with scales upon both faces although it will be obvious that the modification is capable of application to the runner for the Mannheim type of slide rule first described herein. In this modification each guide 31 has a glass 12 secured on each side thereof, and carries above and below, at each end, a separate flange or ridge 32. As will be apparent, these flanges extend from substantially the ends of the guide 31 for a material distance toward the center, but no flange portion is shown at the center, or, what amounts to the same thing, the flange is cut away at the center, as at 33, sufficiently so that the glass plates are exposed, to some extent at least, it being sought to make the glasses 12 readily accessible to the fingers for ease of adjustment. It will be apparent that the flanges illustrated in Figure 5 protect the plates 12 equally well, but in the type of runner here considered, this modification has advantages in assembly, although affording the glass 12 adequate protection. Of course, this construction is equally applicable to the runner shown in Figures 1 to 3, if desired.

In Figures 6, 8 and 9, the guide 14 has a separate protective element 40 shown in Figure 6 as secured by the screw 41 to the side thereof. If desired, the guide may be rabbeted, as at 42, whereby the shield 40 may lie flush with the side of the guide. In lieu of the screw 41, the shield 40 may be secured in the rabbeted portion as by an adhesive as seen in Figure 8. Above the transparent plate the shield 40 is directed inwardly over the top of the plate and is secured in position, say, by the same screw 19 that holds the plate 12 in position. The screws 19 may be wholly relied upon to hold the shield 40 in position, as shown in Figure 9. As there illustrated, the shield 40 is spaced from guide 14, but it will be obvious that the lower end of the shield 40 may, even if not fastened, lie in a rabbeted portion of the guide or be closely positioned with respect to the guide. That is, there may be practically no space between guide 14 and shield 40. A construction substantially the same as that disclosed in Figures 1 through 5 is illustrated in Figure 7. In this instance, however, the shield 45 is secured to the guide 14, preferably within a rabbeted portion 46 as by a screw 47, although it will be obvious that an adhesive or other means may be substituted for the screw 47. The shield 45 is shown as spaced from the end of plate 12 and, when of yielding or resilient material, is thus capable of slight displacement in the absorption of shock without contact with the plate. The shield may extend upwardly to any desired distance. As illustrated, the extremity of the shield or flange 45 is above the tops of the screws 19 so that should the slide rule fall face downwardly, the blow will be received upon the shield and transferred directly to the guide, thus protecting the plate 12.

In a further modification, the shield, in Figures 10, 11 and 12, takes the form of a substantially rectangular member 50 whereof the opposed longer side portions 51 and 52 are perforated as at 53 and 54 to receive the screws 19. One such portion, say 51, is disposed beneath the plate 12 upon the guide 14. The shield 50 is then bent upwardly around the end of plate 12 so that the other side portion 52 overlies the plate 12, the screws 19 being then passed through hole 54, the hole in the plate 12, the hole 53 and into the guide 14. The parts are so positioned that the intermediate portion 55 of the shield is bowed outwardly from the end of plate 12 and is thus spaced therefrom and affords a degree of resiliency to absorb shocks and blows, as in the other modifications. To afford the same advantages as attained by the construction shown in Figure 5, one side portion and the intermediate portion (Figures 13 and 14) may be cut away, as at 57, to form spaced outwardly bowed resilient portions 58 whereof the extremities 59 may overlie the plate 12 and be secured by the screws 19. Obviously, each portion 58—59 may be independent of the other.

It will also be obvious that any of the forms taken by the invention illustrated in Figures 6, 7, 8, 9, 13 and 14 may comprise separate spaced shields affording shock or blow receiving elements carried with the respective screws 19. It will also be observed that the shields are illustrated as extending slightly beyond the corners of the plate 12 as, for instance, at 60 in Figure 13, so as to amply guard the corners of the plate 12. This is a permissive construction having advantage in some situations.

It will thus be seen that a runner is provided offering no obstruction to a full view of the scale, while at the same time the glass is protected and the shock of impact is absorbed in whole or in part and/or transmitted through the guides to the body of the rule.

Various modifications will occur to those skilled in the art in the composition, configuration and disposition of the protective elements carried with the guides of the runner. Furthermore these protective elements may be either integral with the guides or separate and secured thereto. No limitation is intended by the phraseology of the foregoing description or illustrations in the accompanying drawings, except as indicated in the appended claims.

What is claimed is:—

1. A slide rule runner comprising spaced guide devices for slidably engaging opposite edges of a rule, a transverse transparent panel extending across the space between the guide devices, means securing the margins of the panel directly to the guide devices, said panel constituting a connection between the guide devices that hold them in position and yielding means to protect the plate.

2. A slide rule runner comprising spaced guide devices for slidably engaging opposite edges of a rule, a transverse transparent panel extending across the space between the guide devices, means securing the margins of the panel directly to the guide devices, said panel constituting a connection between the guide devices that hold them in position and yielding means carried with the guide to protect the plate.

3. A slide rule runner comprising spaced guide devices for slidably engaging opposite edges of a rule, a transverse transparent panel extending across the space between the guide devices, means securing the margins of the panel directly to the guide devices, said panel constituting a connection between the guide devices that hold them in position and yielding means carried by the guide devices and spaced from the edge of the plate.

4. A slide rule runner comprising spaced guide devices for slidably engaging opposite edges of a rule, a transverse transparent panel extending across the space between the guide devices, means securing the margins of the panel directly to the guide devices, said panel constituting a connection between the guide devices that hold them in position and a protective element carried with the respective guide devices and spaced from the edge of the plate.

5. In a slide rule runner having a transparent plate, a guide, and a shield integral with the guide and spaced from the transparent plate.

6. In a slide rule runner having a transparent plate, a guide, and a yielding shield integral with the guide and spaced from the plate.

7. A slide rule runner having a transparent plate, a guide to which the plate is secured and a flange carried by the guide in spaced relation to the edge of the plate.

8. A slide rule runner comprising spaced guide devices for slidably engaging opposite edges of a rule, a transverse transparent panel extending across the space between the guide devices, means securing the margins of the panel directly to the guide devices, said panel constituting a connection between the guide devices that hold them in position and flanges carried by the respective guide devices in substantially parallel relationship from the edge of the plate and spaced therefrom.

9. A slide rule runner having a transparent plate, guides to which the plate is secured and flanges integral with the respective guides in substantially parallel relationship with the edges of the plate and spaced therefrom.

10. A slide rule runner having a transparent plate, a guide formed with a marginal edge of a height greater than the thickness of the plate and lying wholly in a plane substantially parallel to the edge.

11. A slide rule runner having a transparent plate, a guide formed with a marginal edge of a height greater than the thickness of the plate and spaced from the edge thereof.

12. A slide rule runner having a transparent plate, and a guide having a flange at each end spaced from the plate.

13. A slide rule runner having a transparent plate, a yielding flange carried adjacent each end of the guide and spaced from the edge of the plate.

14. A slide rule runner comprising, in combination, guides, transparent plates carried upon the top and bottom surfaces of the guides, respectively, screws securing the plates to the guides and flanges carried with the top and bottom surfaces of the guides in the plane of the side marginal surfaces of the guides, and of a height substantially greater than the thickness of the plates.

15. A slide rule runner comprising, in combination, guides, transparent plates carried upon the top and bottom surfaces of the guides, respectively, screws securing the plates to the guides and yielding flanges carried with the top and bottom surfaces of the guides in the plane of the side marginal surfaces thereof in spaced relation to the edges of the plates, said flanges being cut away centrally to expose the plates.

16. A slide rule runner comprising spaced guide devices for slidably engaging opposite edges of a rule, a transverse transparent panel extending across the space between the guide devices, means securing the margins of the panel directly to the guide devices, said panel constituting a connection between the guide devices that hold them in position and yielding means spaced from the end of the plate to protect the plate.

In testimony wherof I affix my signature.
ADOLF W. KEUFFEL.